(12) United States Patent
Jaaskelainen et al.

(10) Patent No.: US 11,373,058 B2
(45) Date of Patent: Jun. 28, 2022

(54) SYSTEM AND METHOD FOR TREATMENT OPTIMIZATION

(71) Applicant: HALLIBURTON ENERGY SERVICES, INC., Houston, TX (US)

(72) Inventors: Mikko Jaaskelainen, Katy, TX (US); Henry Clifford Bland, Calgary (CA); Ronald Glen Dusterhoft, Katy, TX (US)

(73) Assignee: HALLIBURTON ENERGY SERVICES INC., Houston, TX (US)

( * ) Notice: Subject to any disclaimer, the term of this patent is extended or adjusted under 35 U.S.C. 154(b) by 538 days.

(21) Appl. No.: 16/573,448

(22) Filed: Sep. 17, 2019

(65) Prior Publication Data
US 2021/0081710 A1 Mar. 18, 2021

(51) Int. Cl.
*G06K 9/62* (2022.01)
*G06N 5/02* (2006.01)
*E21B 43/26* (2006.01)
*E21B 47/06* (2012.01)

(52) U.S. Cl.
CPC ............ *G06K 9/6248* (2013.01); *E21B 43/26* (2013.01); *G06K 9/6215* (2013.01); *G06K 9/6218* (2013.01); *G06N 5/022* (2013.01); *E21B 47/06* (2013.01)

(58) Field of Classification Search
CPC .. G06K 9/6248; G06K 9/6215; G06K 9/6218; G06N 5/022; E21B 43/26; E21B 47/06
USPC .......................................................... 706/52
See application file for complete search history.

(56) References Cited

U.S. PATENT DOCUMENTS

| 7,516,793 B2* | 4/2009 | Dykstra | E21B 43/267 166/250.1 |
| 2011/0125476 A1* | 5/2011 | Craig | G01V 1/288 166/280.1 |
| 2015/0075778 A1* | 3/2015 | Walters | E21B 47/06 166/250.1 |
| 2016/0258267 A1 | 9/2016 | Payne et al. | |

(Continued)

FOREIGN PATENT DOCUMENTS

| WO | 2018084871 A1 | 5/2018 |
| WO | 2018152051 A1 | 8/2018 |
| WO | 2018160171 A1 | 9/2018 |

OTHER PUBLICATIONS

Ojinnaka, Marcellinus A., et al., "Full-course drilling model for well monitoring and stochastic estimation of kick", Journal of Petroleum Science and Engineering, vol. 166, Jul. 2018, pp. 33-43.*

(Continued)

*Primary Examiner* — Robert Stevens
(74) *Attorney, Agent, or Firm* — Polsinelli PC (57) ABSTRACT

A sequence of stimuli produced by an electric frac pump can be generated by a treatment optimization system. Well environment responses to the sequence of stimuli may be measured by sensors and respective sensor data may be received. The sensor data may be used to select a representative system model which can then be used to control the electric frac pump. The representative system model may be used to achieve well stage objectives such as particular cluster efficiencies, complexity factors, or proximity indices.

20 Claims, 6 Drawing Sheets

(56) References Cited

U.S. PATENT DOCUMENTS

2019/0055836 A1    2/2019  Felkl et al.

OTHER PUBLICATIONS

Godhavn, John-Morten, et al., "Drilling seeking automatic control solutions", IFAC Proceedings, vol. 44, Issue 1, Jan. 2011, pp. 10842-10850.*

Landet, Ingar Skyberg, et al., "Modeling and Control of Heave-Induced Pressure Fluctuations in Managed Pressure Drilling", IEEE Transactions on Control Systems Technology, vol. 21, No. 4, Jul. 2013, pp. 1340-1351.*

Nayeem, Ayesha Arjumand, et al., "Monitoring of down-hole parameters for early kick detection", Journal of Loss Prevention in the Process Industries, vol. 40, Mar. 2016, pp. 43-54.*

International Search Report and Written Opinion for International application No. PCT/US2019/060943, dated Jun. 15, 2020, 11 pages.

\* cited by examiner

SYSTEM AND METHOD FOR TREATMENT OPTIMIZATION

TECHNICAL FIELD

The present technology pertains to well treatment plan optimizations.

BACKGROUND

In the oil and gas industry, electric frac pumps are often controlled in order to achieve certain downhole environment responses. However, typically settings are performed manually based on manually appraised information retrieved from the downhole environment. For example, a technician may review sensor data and, based on experience, adjust various settings such as flow rate, pressure values, chemical compositions, etc., on an electric frac pump. In some cases, a representative system model may be used for determining pump settings based on sensor information; however, the representative system model is typically manually selected by a technician based on observed sensor data. Additionally, the representative system model may be a static construct and may not accurately reflect the well to which it has been deployed.

It is with these observations in mind, among others, that aspects of the present disclosure were concerned and developed.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

This disclosure provides techniques for optimizing well treatments using representative system models selected according to formation responses to stimuli indicated by sensor data. In particular, electrically driven pumps (e.g., electric frac pumps), electrical blenders, and other electrical surface equipment can be used to automatically generate a sequence of stimuli in a treatment well. Sensor data in response to the generated sequence of stimuli can then be received from sensors deployed throughout the well (e.g., surface sensors, downhole sensors, wireline sensors, etc.).

In some examples, the sequence of stimuli may be different than the fracturing system control set-points and/or control variables for a given treatment schedule. A given stimulus of the sequence of stimuli can be achieved by adjusting surface pressure values, flow rates, particulate composition (e.g., proppants, diverters, etc.), and/or chemical composition (e.g., friction reducers, surfactants, viscosifiers, etc.). In some examples, a sequence can include a particular stimulus (e.g., injection rate) being stepped through a sequence of various amplitudes (e.g., high, medium, low, etc.). Accordingly, response variables (e.g., responsive sensor data values such as pressure or flow distribution or microseismic events or strain events) can be measured over time to generate a record of a dynamic formation response.

The responsive sensor data may be used to select a pre-defined representative system model for stage and/or well treatment schedules (e.g., treatment sequences, compositions, etc.). In some examples, the responsive sensor data may be used to define a new more representative system model and/or refine a selected model according to specific characteristics of the respective well. For example, the selected representative system model and/or control set-points may be tuned in response to multiple iterations of a stimulus sequence, some of which (in some examples) may be part of an initial treatment schedule based on the selected model. In other examples, a representative system model may be defined based on a multitude of models using parameter uncertainty techniques well known in the art to help find models that represent the observed data more accurately.

Sensors may be deployed to a treatment or monitoring well on surface or downhole. Surface sensor data may be used to project subsurface parameters to downhole positions. For example, a measured surface pressure can be projected to a downhole location based on a model accounting for friction induced pressure drop and/or hydrostatic pressure changes due to gravity.

In particular, the sensor data from surface and/or downhole sensors may be indicative of formation responses. As a result, formation responses to the sequence of stimuli can be determined from resulting sensor data. For example, changes in flow distribution in response to a diverter drop or formation responses at different stimuli levels (e.g., high, medium, or low injection rate, etc.) can be determined based on sensor data and used to derive a representative or appropriate treatment schedule.

Sensors can include, for example and without imputing limitation, single-point electrical sensors, single-point optical sensors, distributed fiber optic sensors, quasi-distributed fiber optic sensors, etc. The sensors may measure, for example and without imputing limitation, temperature, flow, dynamic and/or static strain, acoustic intensity, acoustic phase, resistivity, electromagnetic signals, and frequency, amplitude, or phase of any of the signals, etc. Determined formation responses may include, for example and without imputing limitation, instantaneous fluid flow through a perforation cluster, microseismic information, fracture location, fracture length, fracture height, fracture azimuth, fluid movement and any time variable information of any sensor signal etc. Additionally, sensors may be deployed, for example and without imputing limitation, on surface equipment, on the surface and/or in the vicinity of the well, one a well head, on well flow lines, embedded in or joined to well casing (e.g., a cement casing, etc.), on dispensed tubing (e.g., downhole tubing, etc.), on coiled tubing (e.g., for temporary logging, etc.), or on a wireline, cable, or bare fiber deployment using gravity and/or tractored into the well bore. Sensors may be placed in the treatment well that is being fractured and in one or multiple monitoring wells.

Stimuli can include, for example and without imputing limitation, a selection of surface concentrations of particulates and/or chemicals pumped downhole, an adjustment to fluid rate, or an adjustment to pressure, etc. Further, stimuli may be modified over a span of time as part of a sequence of stimuli. For example, concentrations of particulates and/or chemicals can be periodically varied in predetermined patterns over time to induce various formation responses detectable via deployed sensors. Electric pumps can be controlled to generate specific subsurface conditions (e.g., via fluid rate, etc.) as particulars and/or chemicals enter a formation through perforation clusters. In some examples, flow rates can be controlled dynamically to achieve a particular downhole target pressure, dynamic downhole pressure, and/or a rate profile in coordination with particulate and/or chemical concentrations in a pumped treatment fluid to achieve arrival at particular locations in the formation, such as along a network of fractures.

Response variables (e.g., responsive sensor data values) and respective stimuli (e.g., experimental data) can be used to select, define, and/or construct a representative system model. For example, stimuli and response combination can be mapped to respective system models maintained in an accessible data store. In some examples, a partial model can be generated based on stimuli and response combinations in order to select a pre-constructed representative system model most similar to the partial model. In some examples, a representative system model may be generated based on experimental data and/or data created through simulation with uncertainty parameters.

The generated representative system model may be based on a determined linear or non-linear relationship between system model inputs (e.g., stimuli) and representative system model outputs (e.g., response variables), where a control algorithm is updated (e.g., via curve fitting, etc.) to achieve certain formation responses. In some examples, historical data and/or various machine learning (e.g., neural networks, evolutionary algorithms, Markov models, etc.) processes may be used to generate the representative system model. In some examples, statistical methods can be used to build a mathematical model from experimental data and system identification using design of experiments can be used to fit one or more models and/or perform model reduction. Further, continued iterations may be used to confirm and/or optimize a generated representative system model. In some cases, multiple simulations can be used to create engineering data based on uncertainty parameters to help define cause and effect characteristics of multiple control parameters to generate a more representative system model.

The generated representative system model may be used to, for example, control fracturing operations at the same well used to generate the system model or at another well, such as in the case where the representative system model is generated at an observation well or the like. For example, the representative system model may be used to achieve uniform flow across perforation clusters by adjusting pressure, flow rates, diverter composition, proppant composition, and/or chemical composition at one or more relevant electric frac pumps based on the system model predictions. In some examples, the chosen system model can be used to control formation complexity. In some examples, the chosen system model can be used to predict interference from other wells and/or determine appropriate action to avoid interference.

In some examples, a control proxy may be used for achieving certain objects via control operations based on the chosen system model. For example, cluster efficiency (CE) may be used as a proxy for controlling an electric frac pump by a respective system model generating a cluster efficiency values. In some examples, a complexity factor (CF) may be likewise used as a control proxy for formation complexity and/or a proximity index (PI) may be used as a control proxy for well interference.

In some examples, fracturing operations may vary control parameters at different times based on the chosen system model. For example, the first third of a fracturing operation in each stage may optimize flow distribution (e.g., CE) between clusters, the second third of each stage may optimize reservoir complexity (e.g., CF), and the last third of each stage may optimize (e.g., minimize) well interference (e.g., PI). Additionally, the system model may provide for transitioning between different objects in a predetermined sequence of time or adjusting transitions (e.g., sequence, time, etc.) throughout later stages of a well as earlier sensor data and control variables (e.g., experimental data) is used to further update and revise the chosen system model. As a result, stage level data may be used to predict future stage reservoir properties and various points (e.g., starting points, transition points, etc.) for stage treatment as well as respective stimuli selection and stimuli intensities. The stage fracturing operations are not limited to a three part treatment sequence and more treatment sequences with different time variant objectives are included in the scope.

Figure 1A:
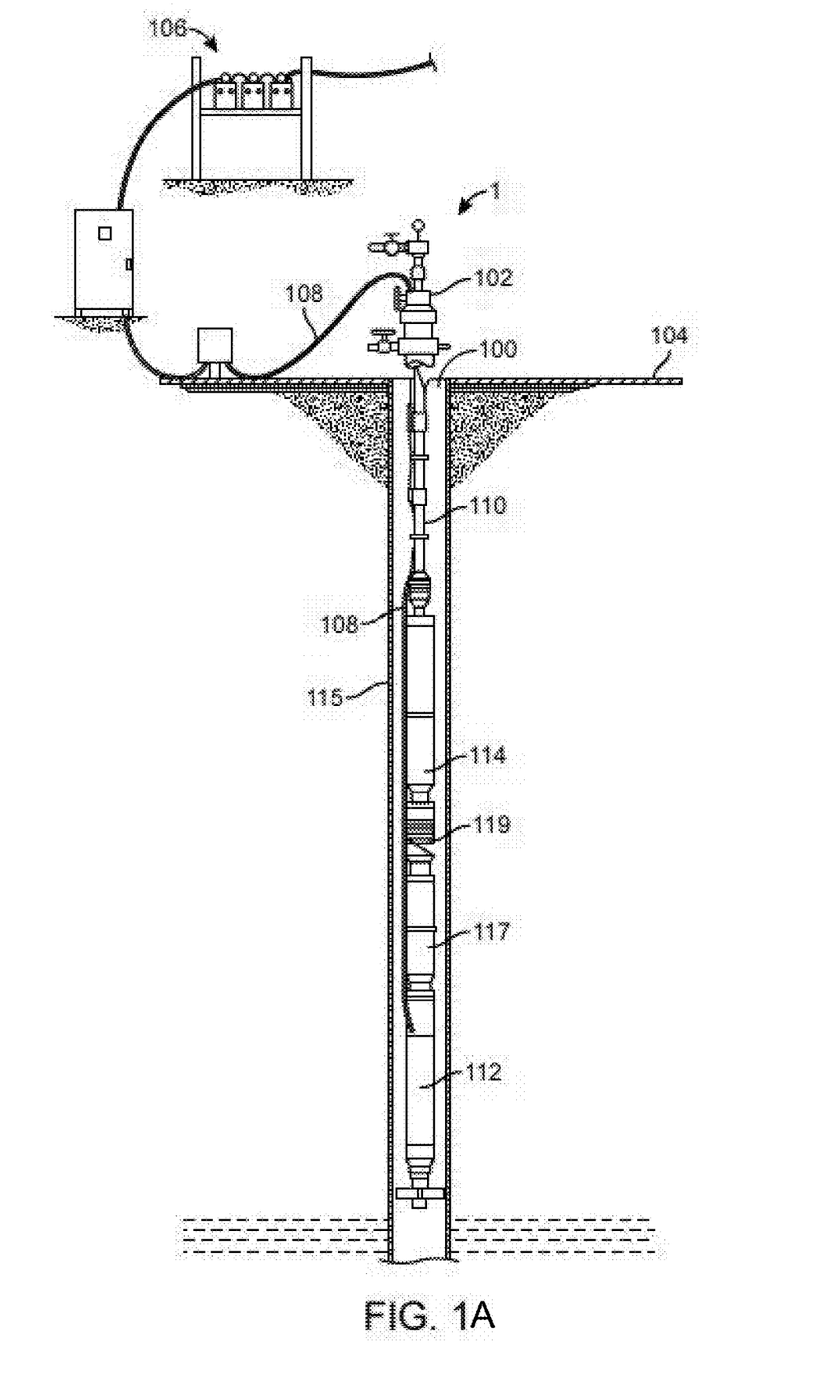
FIG. 1A is a schematic view of a downhole electric frac pump and environment, according to various embodiments of the subject technology.
Figure 1B:
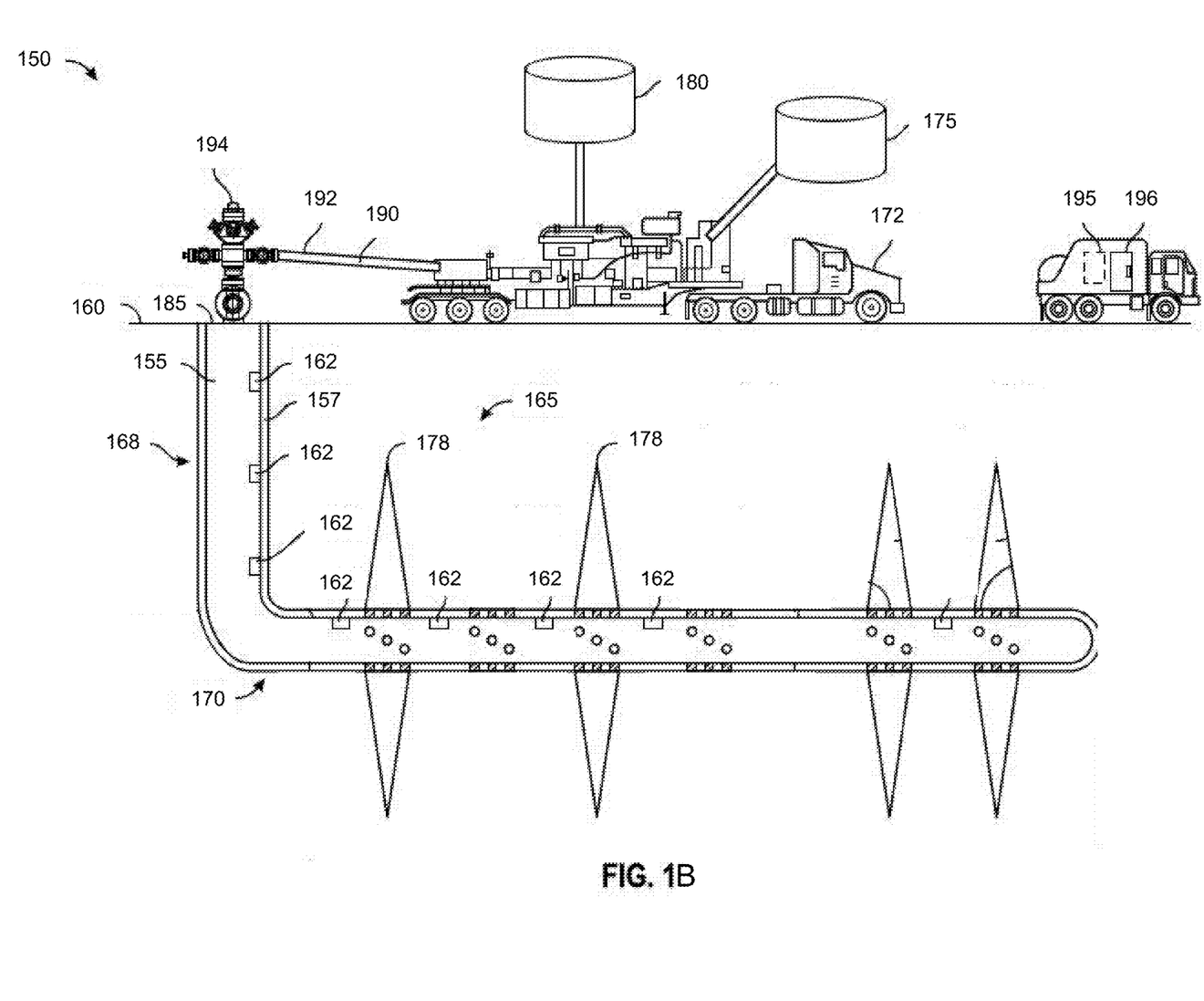
FIG. 1B is diagrammatic view of a surface electric frac pump and environment, according to various embodiments of the subject technology.
Figure 2:
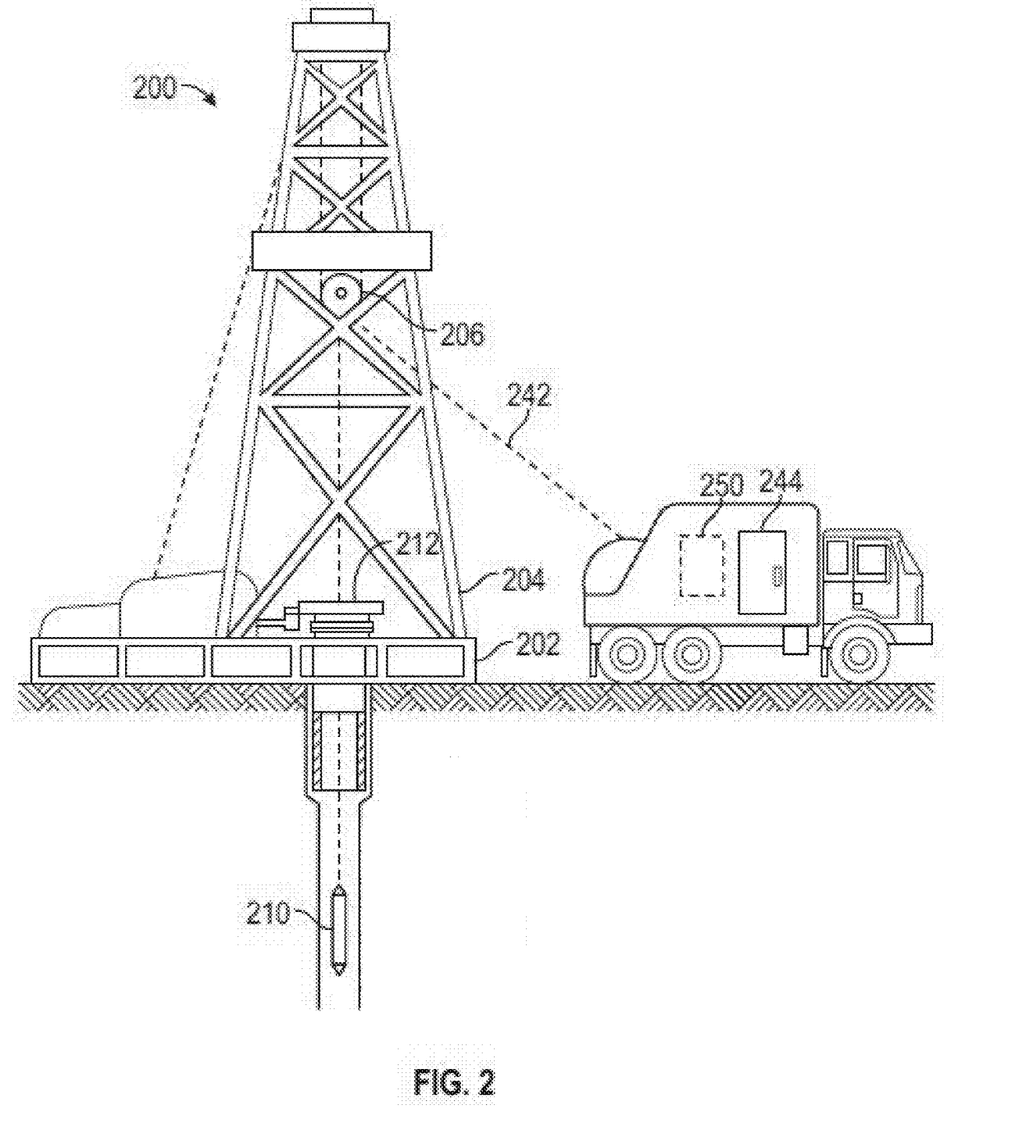
FIG. 2 is a schematic diagram of an example conveyance drilling environment, according to various embodiments of the subject technology.

The disclosure now turns to discussion of various figures for further clarity of explanation. FIGS. 1A, 1B, and 2 respectively depict various environments in which the apparatuses, systems, and methods of the disclosure may be implemented. It is understood that elements and/or steps of the figures depicted may be added, removed, and/or modified without departing from the spirit and scope of the disclosure. Accordingly, the figures are provided for explanatory purposes only and a person of ordinary skill in the art with the benefit of this disclosure may implement and modify the apparatuses, systems, and methods disclosed herein without departing from the spirit and scope of the disclosure.

FIG. 1A depicts an example of a wellbore pumping system 1 in which the apparatuses, systems, and methods of this disclosure may be deployed. The system 1 includes a wellbore 100 having a wellhead 102 at the surface 104. The wellbore 100 extends and penetrates various earth strata including hydrocarbon containing formations. A casing 115 can be cemented along a length of the wellbore 100. A power source 106 can have an electrical cable 108, or multiple electrical cables, extending into the wellbore 100 and coupled with a motor 112. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure. Also, even though FIG. 1 depicts a vertical wellbore, the present disclosure is equally well-suited for use in wellbores having other orientations, including horizontal wellbores, slanted wellbores, multilateral wellbores or the like.

Disposed within the wellbore 100 can be a tubing string 110 having an electric pump 114 forming an electric pump string. The electric pump 114 may be driven by a motor 112. The tubing string 110 can also include a pump intake 119 for withdrawing fluid from the wellbore 100. The pump intake 119, or pump admission, can separate the fluid and gas from the withdrawn hydrocarbons and direct the fluid into the electric pump 114. A protector 117 can be provided between the motor 112 and the pump intake 119 to prevent entrance of fluids into the motor 112 from the wellbore. The tubing string 110 can be a series of tubing sections, coiled tubing, or other conveyance for providing a passageway for fluids. The motor 112 can be electrically coupled with the power source 106 by the electrical cable 108. The motor 112 can be disposed below the electric pump 114 within the wellbore 100. The electric pump 114 can provide artificial pressure, or lift, within the wellbore 100 to increase the withdrawal of hydrocarbons, and/or other wellbore fluids. The electric pump 114 can provide energy to the fluid flow from the well thereby increasing the flow rate within the wellbore 100 toward the wellhead 102.

FIG. 1B is a schematic view of a wellbore operating environment 150 in which apparatuses, systems, and methods as disclosed herein may be deployed. As depicted, a wellbore 155 extends from the surface 160 of the earth through the formation 165 formed by a drilling device from a previous drilling operation (not shown). The wellbore 155 has a vertical segment 168 as well as horizontal segment 170. The wellbore 155 has a casing 157 extending along its length and which may be cemented to the inner surface of the wellbore 155. A plurality of sensors 162 may be provided along the length of the wellbore to detect temperature, pressure, strain, vibration, or flow rate. The plurality of sensors 162 may include for instance pressure or temperature transducers, or may include point and distributed fiber optic sensors. As discussed further below, sensors 162 may be used to generate and execute a data synthesis model. As further illustrated, pump equipment 172 is provided in the form of a truck carrying a pump is provided on the surface 160. While a truck is shown, the pump equipment 172 can be in any form, such as a standalone unit, a plurality of pump units, within a vehicle or outside a vehicle, or integrated with a vehicle, and may be on the surface 160 or partially inserted into the wellbore 155. The pump equipment may be electrical pumps, or hydraulic pumps, or pumps capable of quick adjustment of flow rate. A carrier fluid 175 is provided which may be mixed or blended with, for example, a proppant 180 and pumped by the pump equipment 172 to form a treatment fluid 190. The treatment fluid 190 may be pumped through line 192 into the entrance 185 of the wellbore 155 via fracturing tree 194. The fracturing tree 194 includes various inlets and valves necessary for various fluids, including diversion treatment fluid 140. While the treatment fluid 190 is pumped into the wellbore 155 through the casing 157, in other embodiments, additional tubing, such as coiled tubing, can be inserted within the casing 157 to inject or place the carrier fluid 175 and proppant 180.

In general, the carrier fluid 175 may be continuously pumped into the wellbore 155. The proppant 180 can be introduced periodically into the carrier fluid 175 as a small volume, concentration, or mass. The proppant 180 may be in fluid form or may be a solid, or a semi-solid, a gel, and may be in the form of a particulate, and may be degradable. The proppant 180 may be referred to as a having a concentration (e.g., a concentration of solid, semi-solid) or a mass with the carrier fluid 175 or treatment fluid 190. Further, the proppant 180 may have a flow rate which may be the same or different than the carrier fluid 175 depending on the relative form and density of the proppant 180 and the carrier fluid 175.

A processing facility 196 having a computer system 195 may be provided at the surface 160 for collecting, storing or processing data related to the wellbore operating environment 150. The processing facility may be communicatively coupled, via wire or wirelessly, with the pump equipment 172. The pump equipment 172 may have controls or be controlled by the processing facility 196 including flow rates of the carrier fluid 175, proppant 180, and treatment fluid 190, as well as obtaining data related to flow rates, proppant rates, diversion materials, and chemicals. Additional data may be obtained regarding the wellbore 155, including flow rate distribution wellbore flow distribution of fluid into fractures 178 in the wellbore 155, including temperature and/or pressure distributions throughout the wellbore 155, which may be obtained by the sensors 162 positioned along the length of the casing 157 to detect, for example and without imputing limitation, pressure, temperature, strain, vibration, and/or flow rates along the length of the wellbore 155.

FIG. 2 illustrates a diagrammatic view of a conveyance logging (WL) borehole operating environment 200 (also referred to as "wireline" in the field) in which aspects of the present disclosure can be implemented. A hoist 206 can be included as a portion of a platform 202 which is coupled to a derrick 204. The hoist 206 may be used to raise or lower equipment such as tool 210 into or out of a borehole where the borehole may be a monitoring well where response parameters may be measured in response to changes in flow rate, proppant concentration, diversion concentration or chemicals in a treatment well. A conveyance 242 provides a communicative coupling between tool 210 and a facility 244 at the surface. Conveyance 242 may be a tubular conveyance such as coiled tubing, joint tubing, or other tubulars, and may include wires (one or more wires), slicklines, cables, or the like, as well as a downhole tractor. Additionally, power can be supplied via the conveyance 242 to meet power requirements of the tool. Conveyance 242 may include optical fibers that may be used for communication or distributed fiber optic sensing where the full length of conveyance 242 may act as a distributed sensor. The distributed sensor may be used to measure temperature, acoustics, vibration and strain etc. Tool 210 may have a local power supply, such as batteries, downhole generator and the like. When employing non-conductive cable, coiled tubing, pipe string, or downhole tractor, communication may be supported using, for example, wireless protocols (e.g., EM, acoustic, etc.), and/or measurements and logging data can be stored in local memory for subsequent retrieval. Facility 244 may include a computing device 250 able to communicate with the devices and systems of the present disclosure.

Figure 3:
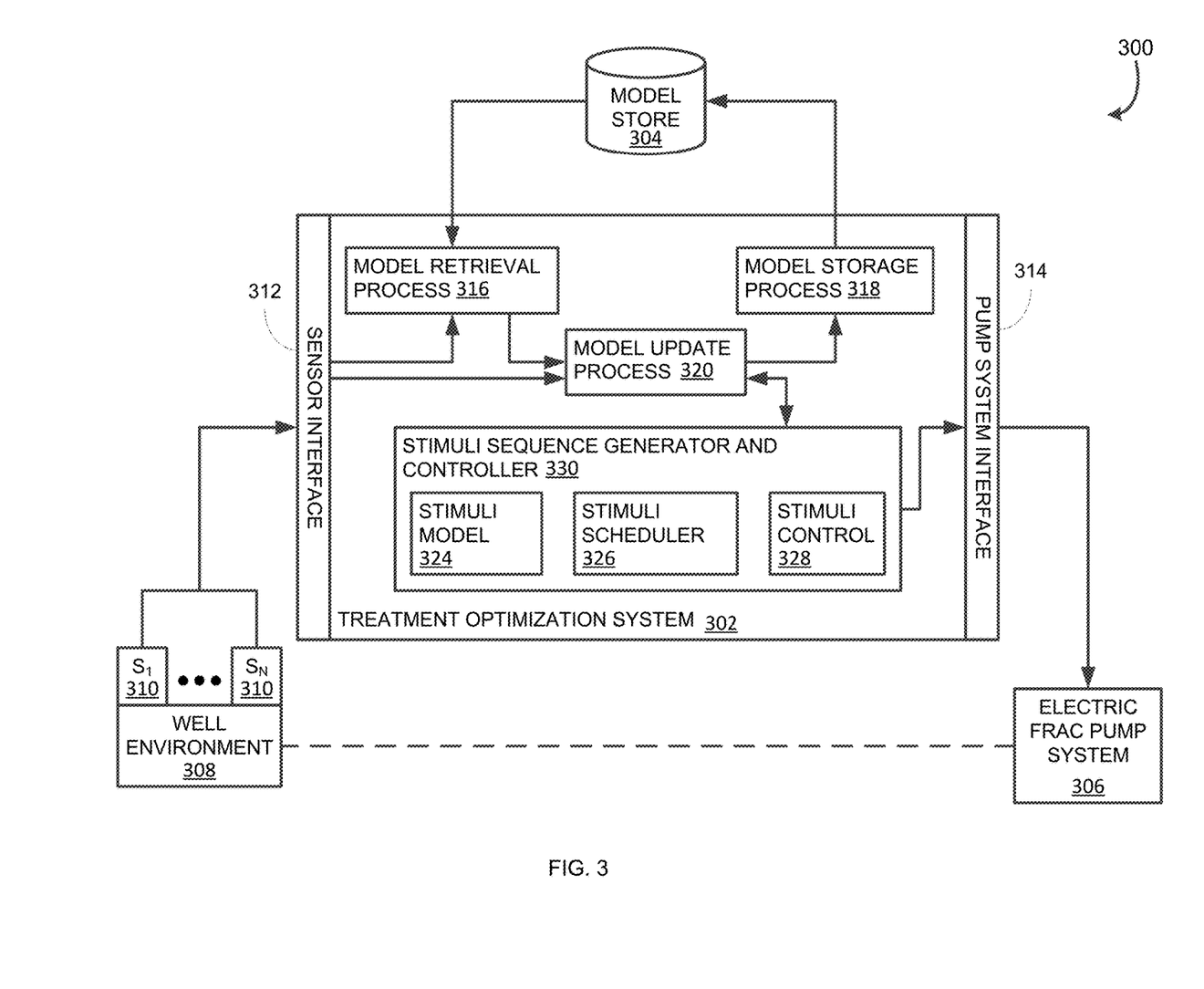
FIG. 3 is a block diagram of a treatment optimization system and environment, according to various embodiments of the subject technology.

FIG. 3 is a block diagram of an operating environment 300 in which a treatment optimization system 302 may be deployed. Treatment optimization system 302 may be deployed as a software application at, for example, facility 244 or processing facility 196 described above. In some examples, treatment optimization system 302 may be deployed to a remote server or cloud provider and so receive and transmit data across one or more network connections. In some examples, treatment optimization system 302 may be deployed to a computer directly or indirectly coupled to one or more electric frac pump systems 306. Nevertheless, and in general, treatment optimization system 302 may execute the various methods and techniques discussed above.

Treatment optimization system 302 is communicatively coupled to a model store 304, an electric frac pump system 306, and well sensors 310. Treatment optimization system may retrieve system models from model store 304 and store updated system models in model store 304, which may be a local data store, such as a local memory, or a remote data store, such as networked memory or storage.

Treatment optimization system 302 sends commands to electric frac pump system 306 via a pump system interface 314. Pump system interface 314 may provide protocol formatting, application programming interfaces (APIs), and the like for providing commands from treatment optimization system 302 that may be interpreted by a particular type of electric frac pump system 306. Treatment optimization system 302 may receive sensors data values from sensors 310 via a sensor interface 312, which may likewise provide protocol formatting, APIs, and the like for receiving data in a format and/or structure interpretable by treatment optimization system 302.

In general, commands sent to electric frac pump system 306 cause electric frac pump system 306 to adjust various settings such as, for example and without imputing limitation, pressure levels, flow rates, composition and/or presence of proppant, diverter, or other chemicals within a pumped fluid, and the like. The pumped fluid is distributed into a well environment 308, the response (e.g., formation response, etc.) of which to the settings of electric frac pump system 306 may be measured by sensors 310 and provided to treatment optimization system 302. Sensors 310 may be located in a treatment well, a monitoring well or on the surface within the treatment equipment or on the surface above the sub-surface well environment 308.

Treatment optimization system 302 includes a model retrieval process 316 for retrieving representative systems models from model store 304. In particular, model retrieval process 316 may receive sensors information from sensor interface 312 in order to determine which system model to retrieve from model store 304. A stimuli sequence generator and controller 330 may generate a sequence of stimuli which are provided as commands to electric frac pump system 306 through pump system interface 314. The generated sequence of stimuli may be used to produce a response, and resulting sensor data from sensors 310, from well environment 308. As a result, model retrieval process 316 may retrieve a system model based on the response information from well environment 308 as a result of stimuli sequence generator and controller 330.

In some examples, model retrieval process 316 may provide the retrieved model to a model update process 320, which may update and/or modify the retrieved model based on sensor values received via sensor interface 312. As a result, in some examples, stimuli sequence generator and controller 330 may generate iterative stimuli commands and/or sequences to update or modify a retrieved system model. In some examples, a representative system model may be generated directly as a result of the generate sequence of stimuli rather than retrieved. In some examples, updated system model parameters and/or new representative system models may be provided to model store 304 by a model storage process 318 in order to later retrieve the stored representative system models. In some examples, stimuli sequence generator and controller 330 may modify the stimuli commands and/or sequences based on the updated models.

Stimuli sequence generator and controller 330 includes a stimuli model 324, a stimuli scheduler 326, and a stimuli control 328. Stimuli model 324 may be used to determine which stimuli to produce and/or modify to generate, update, or apply a representative system model. Stimuli scheduler 326 may generate a stimuli sequence based on the stimuli determined by stimuli model 324. Stimuli control 328 may execute the generate stimuli sequence by generating respective commands, based on the scheduled sequence, to provide to pump system interface 314.

Figure 4:
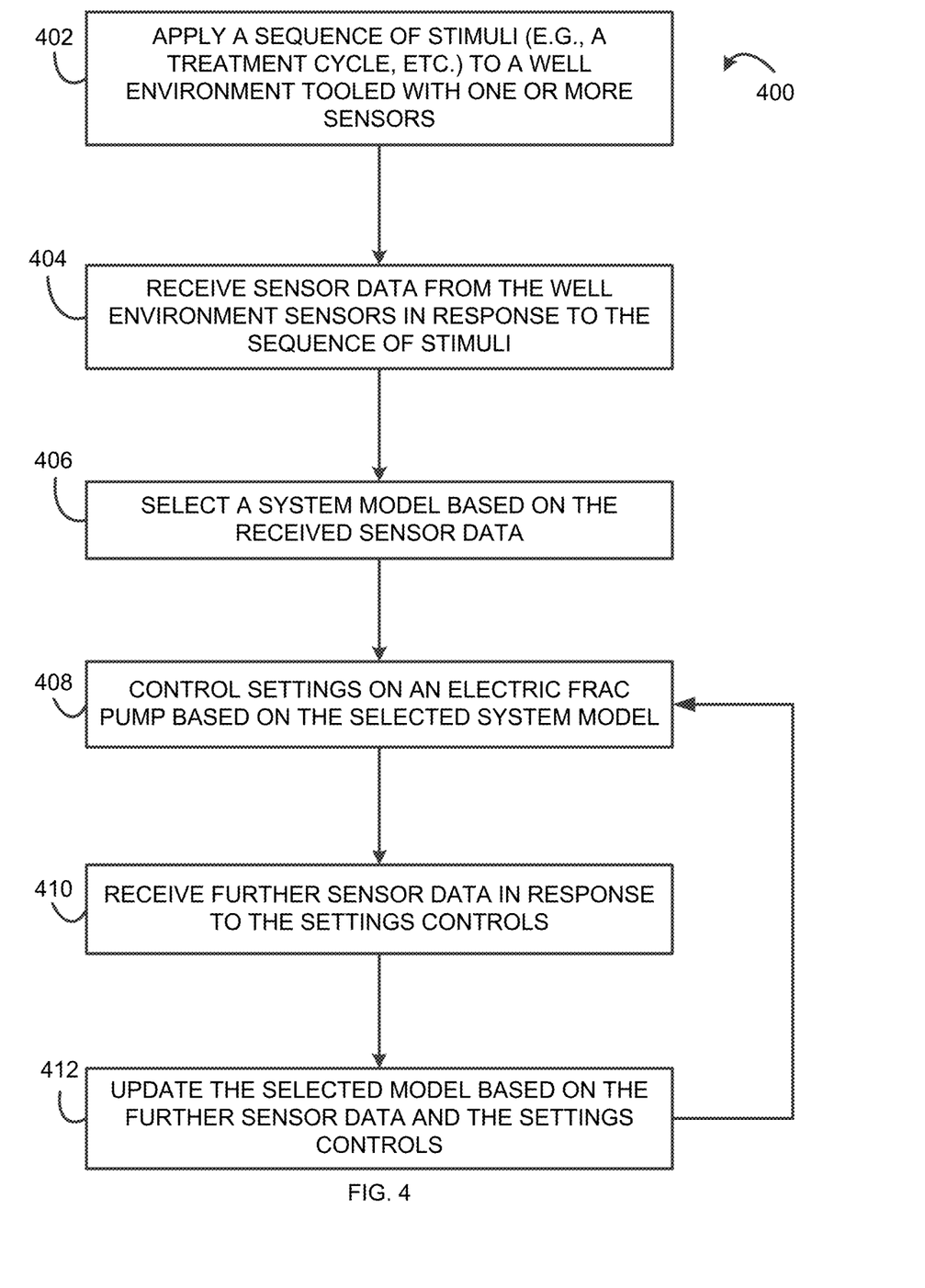
FIG. 4 is a flowchart of an example method for optimizing a well treatment plan, according to various embodiments of the subject technology.

FIG. 4 is a flowchart of a method 400 for selecting and executing a representative system model. Method 400 may be performed, for example, by treatment optimization system 302 discussed above or a substantially similar system. At step 402, a sequence of stimuli, such as a treatment cycle or the like, is applied to a well environment tooled with one or more sensors.

At step 404, sensor data is received from the well environment sensors in response to the sequence of stimuli. In some examples, an interface or interpreter may convert the received sensor data, which may be received in various signal formats, into a format and/or structure interpretable by a particular system. In some examples, normalization processes or the like may be applied to the received sensor data to make the data mathematically comparable, etc.

At step 406, a representative system model is selected based on the received sensor data. The representative system model may be selected based on, for example, an operation performed on the received sensor data (e.g., transformation, hashing, or similar processes). In some examples, a partial system model may be generated based on the received sensor data and the representative system model may be selected accordingly to a similarity measure or the like.

At step 408, settings on an electric frac pump are controlled based on the selected representative system model. Settings may include pressure, flow rate, chemical (e.g., proppant, diverter, etc.) composition of a pumped fluid, or the like. In some examples, at step 410, further sensor data is received in response to the settings controls. At step 412, the selected model can be updated based on the further sensor data and the settings controls. In some examples, method 400 may loop to step 408 and so the selected model may continue to go through update cycles (e.g., iterations) as control settings are adjusted in response to sensor data.

Figure 5:
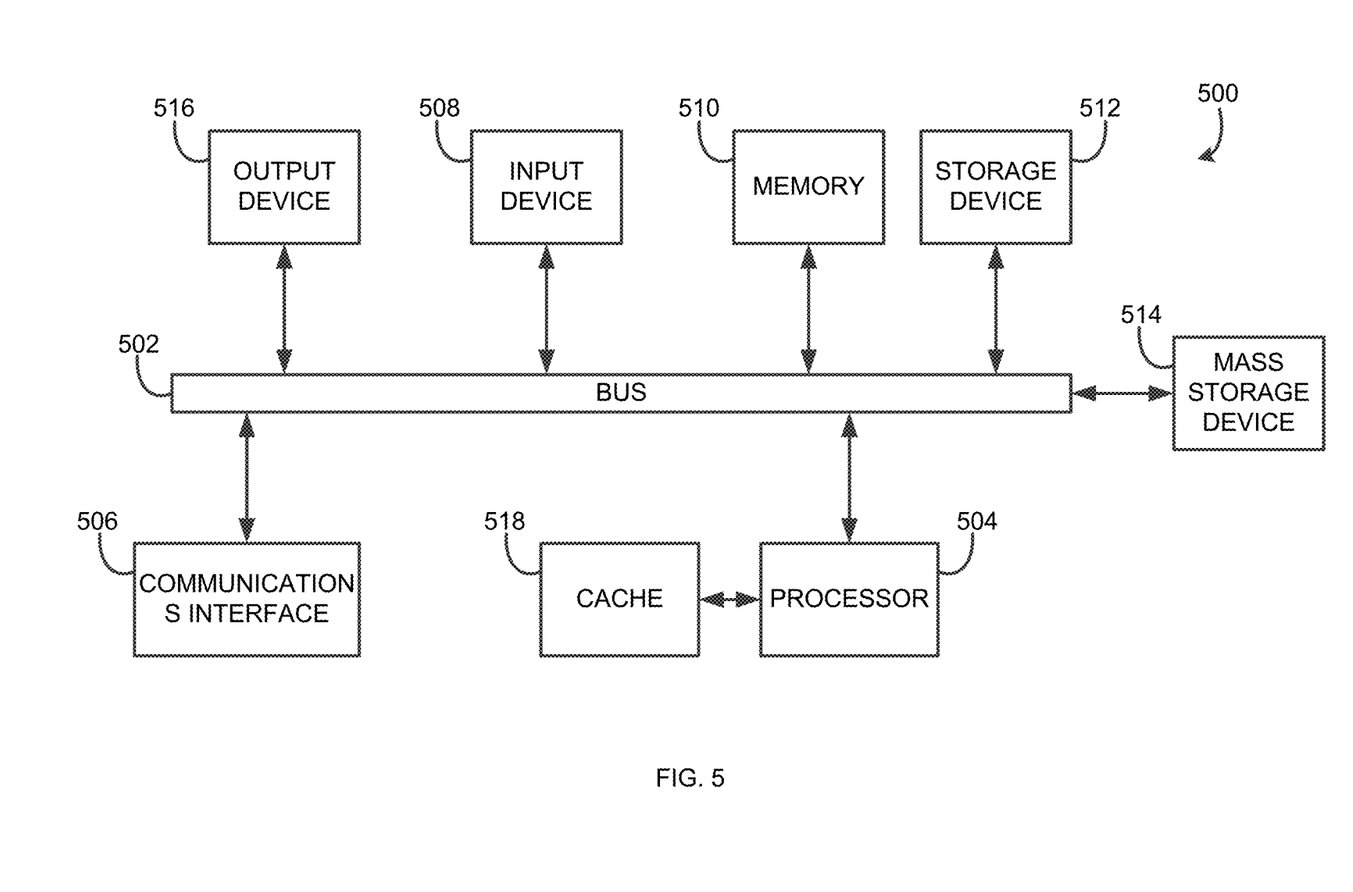
FIG. 5 is a system diagram illustrating a computing system, in accordance with various embodiments of the subject technology.

FIG. 5 is a schematic diagram of a computing system 500 that may implement various systems and methods discussed herein. The computing system 500 includes one or more computing components in communication via a bus 502. In one embodiment, the computing system 500 may include one or more processes 504. The processor 504 can include one or more internal levels of cache 518 and a bus controller or bus interface unit to direct interaction with the bus 502. The processor 504 can specifically implement the various methods discussed herein. Memory 510 may include one or more memory cards and a control circuit, or other forms of removable memory, and can store various software applications including computer executable instructions, that when run on the processor 504 implement the methods and systems set out herein. Other forms of memory, such as a storage device 512 and a mass storage device 514, can also be included and accessible by the processor (or processors) 504 via the bus 502. The storage device 512 and mass storage device 514 can each contain any or all of the methods and systems, in whole or in part, discussed herein. In some examples, the storage device 512 or the mass storage device 514 can provide a database or repository in order to store data as discussed below.

The computing system 500 can further include a communications interface 506 by way of which the computing system 500 can connect to networks and receive data useful in executing the methods and systems set out herein as well as transmitting information to other devices. The computer system 500 can also include an input device 508 by which information is input. Input device 508 can be a scanner, keyboard, and/or other input devices as will be apparent to a person of ordinary skill in the art. The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Numerous examples are provided herein to enhance understanding of the present disclosure. A specific set of statements are provided as follows:

Statement 1: A computer-implemented method for controlling electrical fracturing equipment for fracturing a well includes generating a sequence of stimuli for application to a well environment, the sequence of stimuli including one or more of particulate concentrations, chemical concentrations, or a pump rate control, receiving formation response data including data from one or more downhole sensors or surface sensors, selecting a representative system model based on the received formation response data and sequence of stimuli, and controlling an electrical fracturing pump based on the representative system model.

Statement 2: The method of preceding Statement 1 may further include the representative system model being retrieved from a data store based the received formation response data.

Statement 3: The method of any of the preceding Statements may include the representative system model being generated based on data created through simulation with uncertainty parameters.

Statement 4: The method of any of the preceding Statements may include selecting the representative system model further including determining one of a linear or a non-linear relationship between the sequence of stimuli and received formation response data, and updating the one of the linear or the non-linear relationship based on multiple iterations of the generated sequence of stimuli.

Statement 5: The method of any of the preceding Statements may include the data from the one or more downhole sensors or surface sensors being used to determine changes in flow distribution in response to a diverter drop, the changes in flow distribution used to determine the representative system model.

Statement 6: The method of any of the preceding Statements may include the one or more downhole sensors or surface sensors including one or more of a single-point electrical sensors, an optical sensor, or a fiber optic sensor.

Statement 7: The method of any of the preceding Statements may include the formation response data including measurements of one or more of pressure, temperature, flow, dynamic strain, static strain, acoustic intensity, resistivity, or electromagnetic signals or frequency, amplitude or phase of any of the electromagnetic signals.

Statement 8: The method of any of the preceding Statements may include the representative system model predicting a proxy value including one or more of a cluster efficiency, a complexity factor, or a proximity index, and the predicted proxy value is used to control one or more of a uniform flow across perforation clusters, a formation complexity, or interference in a neighboring well.

Statement 9: A system for controlling electrical fracturing equipment for fracturing a well includes one or more processors, and a memory comprising instructions to generate a sequence of stimuli for application to a well environment, the sequence of stimuli including one or more of particulate concentrations, chemical concentrations, or a pump rate control, receive formation response data including data from one or more downhole sensors or surface sensors, select a representative system model based on the received formation response data and sequence of stimuli, and control an electrical fracturing pump based on the representative system model.

Statement 10: The system of preceding Statement 9 may include the representative system model being retrieved from a data store based the received formation response data.

Statement 11: The system of any of preceding Statements 9-10 may include the representative system model is generated based on data created through simulation with uncertainty parameters.

Statement 12: The system of any of preceding Statements 9-11 may include selecting the representative system model further including determining one of a linear or a non-linear relationship between the sequence of stimuli and received formation response data, and updating the one of the linear or the non-linear relationship based on multiple iterations of the generated sequence of stimuli.

Statement 13: The system of any of preceding Statements 9-12 may include the data from the one or more downhole sensors or surface sensors being used to determine changes in flow distribution in response to a diverter drop, the changes in flow distribution used to determine the representative system model.

Statement 14: The system of any of preceding Statements 9-10 may include the formation response data including measurements of one or more of pressure, temperature, flow, dynamic strain, static strain, acoustic intensity, resistivity, or electromagnetic signals or frequency, amplitude or phase of any of the electromagnetic signals.

Statement 15: The system of any of preceding Statements 9-10 may include the representative system model predicting a proxy value including one or more of a cluster efficiency, a complexity factor, or a proximity index, and the predicted proxy value is used to control one or more of a uniform flow across perforation clusters, a formation complexity, or interference from a neighboring well.

Statement 16: A non-transitory computer readable medium stores instructions that, when executed by one or more processors, cause the one or more processors to generate a sequence of stimuli for application to a well environment, the sequence of stimuli including one or more of particulate concentrations, chemical concentrations, or a pump rate control, receive formation response data including data from one or more downhole sensors or surface sensors, select a representative system model based on the received formation response data and sequence of stimuli, and control an electrical fracturing pump based on the representative system model.

Statement 17: The non-transitory computer readable medium of preceding Statement 16 may include the representative system model being retrieved from a data store based the received formation response data.

Statement 18: The non-transitory computer readable medium of any of preceding Statements 16-17 may include the representative system model being generated based on data created through simulation with uncertainty parameters.

Statement 19: The non-transitory computer readable medium of any of preceding Statements 16-18 may include selecting the representative system model further including determining one of a linear or a non-linear relationship between the sequence of stimuli and received formation response data, and updating the one of the linear or the non-linear relationship based on multiple iterations of the generated sequence of stimuli.

Statement 20: The non-transitory computer readable medium of any of preceding Statements 16-19 may include the formation response data including measurements of one or more of pressure, temperature, flow, dynamic strain, static strain, acoustic intensity, resistivity, electromagnetic signals, or frequency, amplitude or phase of any of the signals, and the representative system model predicts a proxy value comprising one or more of a cluster efficiency, a complexity factor, or a proximity index, and the predicted proxy value is used to control one or more of a uniform flow across perforation clusters, a formation complexity, or interference from a neighboring well.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various examples of the disclosure or described with different terminology. These and other variations, modifications, additions, and improvements may fall within the scope of the disclosure as defined in the claims that follow.

What is claimed is:

1. A computer-implemented method for controlling electrical fracturing equipment for fracturing a well, the method comprising:
    generating a sequence of stimuli for application to a well environment, the sequence of stimuli comprising one or more of particulate concentrations, chemical concentrations, or a pump rate control;
    receiving formation response data comprising data from one or more downhole sensors or surface sensors;
    selecting a representative system model based on the received formation response data and sequence of stimuli; and
    controlling an electrical fracturing pump based on the representative system model.

2. The method of claim 1, wherein the representative system model is retrieved from a data store based the received formation response data.

3. The method of claim 1, wherein the representative system model is generated based on data created through simulation with uncertainty parameters.

4. The method of claim 1, wherein selecting the representative system model further comprises:
    determining one of a linear or a non-linear relationship between the sequence of stimuli and received formation response data; and
    updating the one of the linear or the non-linear relationship based on multiple iterations of the generated sequence of stimuli.

5. The method of claim 1, wherein the data from the one or more downhole sensors or surface sensors is used to determine changes in flow distribution in response to a diverter drop, the changes in flow distribution used to determine the representative system model.

6. The method of claim 1, wherein the one or more downhole sensors or surface sensors comprises one or more of a single-point electrical sensors, an optical sensor, or a fiber optic sensor.

7. The method of claim 1, wherein the formation response data comprises measurements of one or more of pressure, temperature, flow, dynamic strain, static strain, acoustic intensity, resistivity, or electromagnetic signals or frequency, amplitude or phase of any of the electromagnetic signals.

8. The method of claim 1, wherein the representative system model predicts a proxy value comprising one or more of a cluster efficiency, a complexity factor, or a proximity index, and the predicted proxy value is used to control one or more of a uniform flow across perforation clusters, a formation complexity, or interference in a neighboring well.

9. A system for controlling electrical fracturing equipment for fracturing a well, the system comprising:
    one or more processors; and
    a memory comprising instructions to:
        generate a sequence of stimuli for application to a well environment, the sequence of stimuli comprising one or more of particulate concentrations, chemical concentrations, or a pump rate control;
        receive formation response data comprising data from one or more downhole sensors or surface sensors;
        select a representative system model based on the received formation response data and sequence of stimuli; and
        control an electrical fracturing pump based on the representative system model.

10. The system of claim 9, wherein the representative system model is retrieved from a data store based the received formation response data.

11. The system of claim 9, wherein the representative system model is generated based on data created through simulation with uncertainty parameters.

12. The system of claim 9, wherein selecting the representative system model further comprises:
    determining one of a linear or a non-linear relationship between the sequence of stimuli and received formation response data; and
    updating the one of the linear or the non-linear relationship based on multiple iterations of the generated sequence of stimuli.

13. The system of claim 9, wherein the data from the one or more downhole sensors or surface sensors is used to determine changes in flow distribution in response to a diverter drop, the changes in flow distribution used to determine the representative system model.

14. The system of claim 9, wherein the formation response data comprises measurements of one or more of pressure, temperature, flow, dynamic strain, static strain, acoustic intensity, resistivity, or electromagnetic signals or frequency, amplitude or phase of any of the electromagnetic signals.

15. The system of claim 9, wherein the representative system model predicts a proxy value comprising one or more of a cluster efficiency, a complexity factor, or a proximity index, and the predicted proxy value is used to control one or more of a uniform flow across perforation clusters, a formation complexity, or interference from a neighboring well.

16. A non-transitory computer readable medium storing instructions that, when executed by one or more processors, cause the one or more processors to:
   generate a sequence of stimuli for application to a well environment, the sequence of stimuli comprising one or more of particulate concentrations, chemical concentrations, or a pump rate control;
   receive formation response data comprising data from one or more downhole sensors or surface sensors;
   select a representative system model based on the received formation response data and sequence of stimuli; and
   control an electrical fracturing pump based on the representative system model.

17. The non-transitory computer readable medium of claim 16, wherein the representative system model is retrieved from a data store based the received formation response data.

18. The non-transitory computer readable medium of claim 16, wherein the representative system model is generated based on data created through simulation with uncertainty parameters.

19. The non-transitory computer readable medium of claim 16, wherein selecting the representative system model further comprises:
   determining one of a linear or a non-linear relationship between the sequence of stimuli and received formation response data; and
   updating the one of the linear or the non-linear relationship based on multiple iterations of the generated sequence of stimuli.

20. The non-transitory computer readable medium of claim 16, wherein the formation response data comprises measurements of one or more of pressure, temperature, flow, dynamic strain, static strain, acoustic intensity, resistivity, electromagnetic signals, or frequency, amplitude or phase of any of the signals, and the representative system model predicts a proxy value comprising one or more of a cluster efficiency, a complexity factor, or a proximity index, and the predicted proxy value is used to control one or more of a uniform flow across perforation clusters, a formation complexity, or interference from a neighboring well.

* * * * *

(12) POST-GRANT REVIEW CERTIFICATE (285th)

United States Patent
Jaaskelainen et al.

(10) Number: US 11,373,058 J1
(45) Certificate Issued: Jan. 30, 2025

(54) SYSTEM AND METHOD FOR TREATMENT OPTIMIZATION (71) Applicants: Mikko Jaaskelainen; Henry Clifford Bland; Ronald Glen Dusterhoft (72) Inventors: Mikko Jaaskelainen; Henry Clifford Bland; Ronald Glen Dusterhoft (73) Assignee: HALLIBURTON ENERGY SERVICES, INC.

Trial Number:

PGR2023-00023 filed Mar. 28, 2023

Post-Grant Review Certificate for:

Patent No.: 11,373,058
Issued: Jun. 28, 2022
Appl. No.: 16/573,448
Filed: Sep. 17, 2019

The results of PGR2023-00023 are reflected in this post-grant review certificate under 35 U.S.C. 328(b).

POST-GRANT REVIEW CERTIFICATE
U.S. Patent 11,373,058 J1
Trial No. PGR2023-00023
Certificate Issued Jan. 30, 2025

AS A RESULT OF THE POST-GRANT REVIEW PROCEEDING, IT HAS BEEN DETERMINED THAT:

Claims 1-20 are cancelled.

\* \* \* \* \*